United States Patent
Bagepalli et al.

[11] Patent Number: 5,915,697
[45] Date of Patent: *Jun. 29, 1999

[54] FLEXIBLE CLOTH SEAL ASSEMBLY

[75] Inventors: Bharat Sampathkumar Bagepalli, Niskayuna; Joseph Charles Taura, Clifton Park; Mahmut Faruk Aksit; Mehmet Demiroglu, both of Troy; Daniel Ross Predmore, Clifton Park, all of N.Y.

[73] Assignee: General Electric Company, Schenectady, N.Y.

[ * ] Notice: This patent is subject to a terminal disclaimer.

[21] Appl. No.: 08/934,549

[22] Filed: Sep. 22, 1997

[51] Int. Cl.$^6$ .............................. F16L 17/06; F16J 15/02
[52] U.S. Cl. ...................... 277/627; 277/642; 277/651; 277/652
[58] Field of Search ...................... 277/604, 609, 277/627, 634, 637, 641, 642, 651, 652

[56] References Cited

U.S. PATENT DOCUMENTS

| | | | |
|---|---|---|---|
| 1,293,615 | 2/1919 | Mitchell et al. | 277/627 |
| 2,249,127 | 7/1941 | Goetze | 277/654 |
| 3,201,150 | 8/1965 | Aydelott | 277/604 |
| 3,445,120 | 5/1969 | Barr | 277/627 |
| 3,447,819 | 6/1969 | Borsum et al. | 277/609 |
| 3,970,318 | 7/1976 | Tuley | 277/641 |
| 4,186,932 | 2/1980 | Emhardt et al. | 277/604 |
| 5,104,286 | 4/1992 | Donlan | 277/641 |
| 5,265,412 | 11/1993 | Bagepalli et al. | 277/355 |
| 5,400,586 | 3/1995 | Bagepalli et al. | 60/39.32 |
| 5,474,306 | 12/1995 | Bagepalli et al. | 277/53 |
| 5,509,669 | 4/1996 | Wolfe et al. | 277/167.5 |
| 5,586,773 | 12/1996 | Bagepalli et al. | 277/167.5 |
| 5,657,998 | 8/1997 | Dinc et al. | 277/230 |

FOREIGN PATENT DOCUMENTS 571789   9/1945   United Kingdom ................... 277/637

*Primary Examiner*—Michael F. Trettel
*Assistant Examiner*—Marcos Dolce
*Attorney, Agent, or Firm*—Douglas E. Erickson; Marvin Snyder

[57] ABSTRACT

A seal assembly having a flexible cloth seal which includes a shim assemblage surrounded by a cloth assemblage. A first tubular end portion, such as a gas turbine combustor, includes a longitudinal axis and has smooth and spaced-apart first and second surface portions defining a notch therebetween which is wider at its top than at its bottom and which extends outward from the axis. The second surface portion is outside curved, and a first edge of the cloth seal is positioned in the bottom of the notch. A second tubular end portion, such as a first stage nozzle, is located near, spaced apart from, and coaxially aligned with, the first tubular end portion. The second tubular end portion has a smooth third surface portion which surrounds at least a portion of the first tubular end portion and which is contacted by the cloth seal.

14 Claims, 5 Drawing Sheets

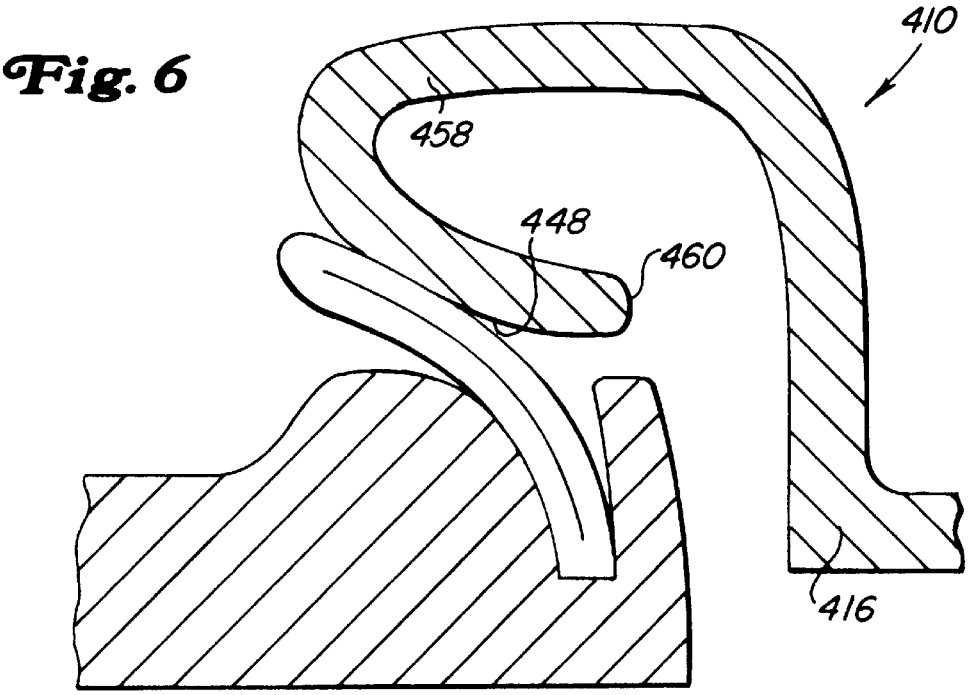
Fig. 6
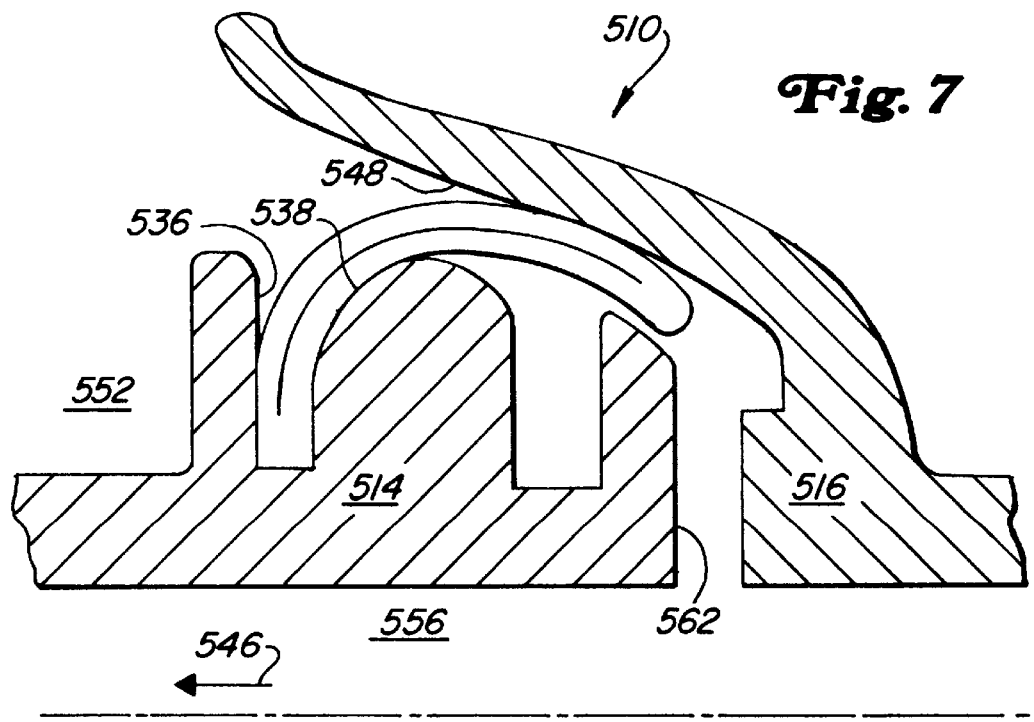
Fig. 7

FLEXIBLE CLOTH SEAL ASSEMBLY

This invention was made with Government support under Government Contract No. DEFC21-95-MC31176 awarded by the Department of Energy. The Government has certain rights to this invention.

FIELD OF THE INVENTION

The present invention relates generally to seals, and more particularly to a flexible cloth seal assembly.

BACKGROUND OF THE INVENTION

Seals are used to minimize leakage of fluids. A known seal is a cloth seal having a generally impervious shim assemblage and a cloth assemblage generally surrounding the shim assemblage. Cloth seals may be used in many applications including, but not limited to, seal assemblies for steam turbines and gas turbines used for power generation and seal assemblies for gas turbines used for aircraft and marine propulsion.

A steam turbine has a steam path which typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Gas or steam leakage, either out of the gas or steam path or into the gas or steam path, from an area of higher pressure to an area of lower pressure, is generally undesirable. For example, gas-path leakage in the turbine area of a gas turbine will lower the efficiency of the gas turbine leading to increased fuel costs. Also, gas-path leakage in the combustor area of a gas turbine will require an increase in burn temperature to maintain power level, such increased burn temperature leading to increased pollution, such as increased NOx and CO production.

Gas-path leakage occurs through gaps between larger gas turbine components such as through gaps between the combustor and the turbine, and gas-path leakage occurs through gaps between smaller gas turbine components such as through gaps between combustor casing segments. Such components have surfaces of different shapes, suffer from assembly misalignment, and undergo vibration. For example, vibration is particularly important during startup of a turbine rotor which must pass through one or more critical frequencies before reaching operational speed. Also, hot section components, such as combustors and turbines, thermally experience hot gas flow and typically undergo different thermal growths. Steampath leakage occurs through gaps between steam turbine components in a manner similar to that for gas-path leakage through gaps between gas turbine components.

Cloth seal installations have been proposed for use in gas-path leakage gaps of gas turbines and for use in steampath leakage gaps of steam turbines. However, such conventional cloth seal assemblies cannot handle large changes in the size of the leakage-path gap between the two components and therefore have not been proposed for use in such "large gap change" applications. A conventional cloth seal assembly used in such a "large gap change" application would have the cloth seal become crimped (i.e., nonelastically bent) when the gap between the two components became very small and thereafter would not seal when the gap returned to normal or became very large.

Conventional seals used in such "large gap change" applications include a conventional rigid or leaf seal made of metal which may have a leakage of 2.4% (primarily from flow around the seal due to different surface shapes, assembly misalignment, vibration, thermal growth, and/or wear). Such leakage in the combustor may result in a 15 (or much higher) parts-per-million (ppm) NOx production and a similar CO production. It is noted that conventional rigid or leaf seals do not seal as well as cloth seals. What is needed is an improved seal assembly having a flexible cloth seal that can accommodate large changes in the size of the gas-path leakage gap due to vibration, thermal differential expansion, etc.

SUMMARY OF THE INVENTION

The seal assembly of the invention includes a flexible cloth seal, a first tubular end portion, and a second tubular end portion. The flexible cloth seal has a generally impervious shim assemblage, a cloth assemblage generally surrounding said shim assemblage, generally opposing first and second edges, and generally opposing first and second sides bounded by the first and second edges and separated by the thickness of the cloth assemblage. The first tubular end portion has generally opposing, generally smooth, and spaced apart first and second surface portions defining a notch therebetween. The notch has a narrower bottom, has a wider top which is also wider than the thickness of the flexible cloth seal proximate the top, and extends from the bottom outward from the longitudinally extending axis of the first tubular end portion. The second surface portion is generally outside curved, the first edge of the flexible cloth seal is positioned in the notch proximate the bottom, and the first side of the flexible cloth seal proximate the first edge faces the first surface portion of the first tubular end portion in a direction whose projection onto the axis defines a first longitudinal direction. The second tubular end portion is located proximate, is spaced apart from, and is generally coaxially aligned with, the first tubular end portion. The second tubular end portion has a generally smooth third surface portion surrounding at least a portion of the first tubular end portion and extending further away from the axis as one moves longitudinally in a direction opposite the first longitudinal direction. The first side of the flexible cloth seal proximate the second edge contacts the third surface portion. The first side has a first area which is exposed to a lower pressure region, and the second side has a second area which is generally opposite the first area and which is exposed to a higher pressure region. The second edge of the flexible cloth seal points in a direction whose projection onto the axis is aligned opposite the first longitudinal direction.

Several benefits and advantages are derived from the invention. The second side of the flexible cloth seal will lie against the outside curved second surface portion during very small gaps, such second surface portion providing support against elastic deformation that would otherwise occur in "large gap change" applications, as can be appreciated by those skilled in the art. Engineering analysis indicates the seal assembly of the invention will result in a 0.4% gas or steam leakage rate which, in gas or steam turbine applications used for power generation, could result in savings of tens of thousands of dollars per year per turbine compared to conventional rigid or leaf seals or conventional cloth seal installations. It is expected that such improved gas-path leakage using the seal assembly of the present invention will also result in a corresponding lower NOx and CO production that will meet future governmental pollution standards of 9 ppm NOx production and 9 ppm CO production.

DESCRIPTION OF THE DRAWINGS

FIG. 6 is a view, as in FIG. 1, but of a fourth preferred embodiment of the seal assembly of the present invention; and FIG. 7 is a view, as in FIG. 1, but of a fifth preferred embodiment of the seal assembly of the present invention.

DETAILED DESCRIPTION OF THE INVENTION

Figure 1:
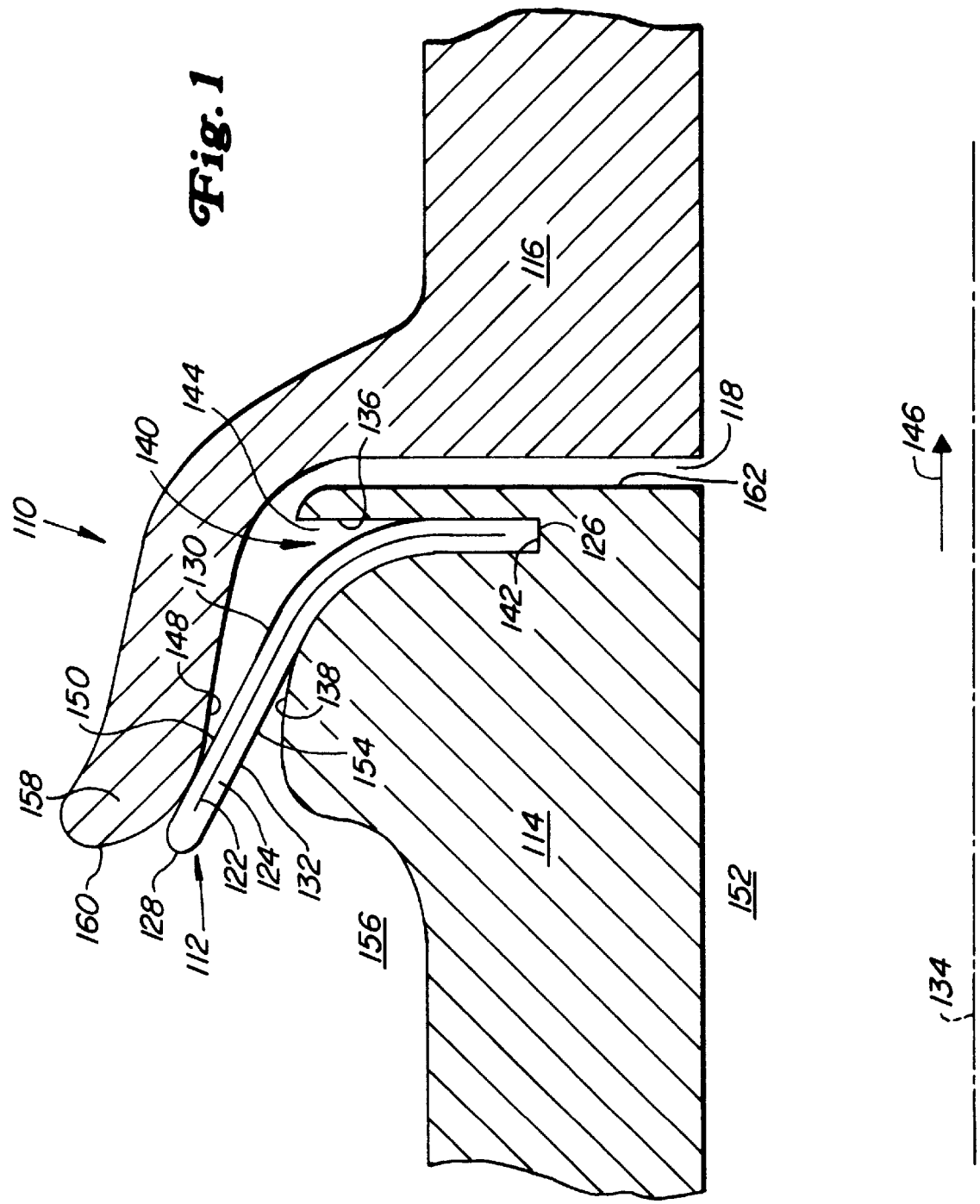
FIG. 1 is a schematic cross-sectional view of a first preferred embodiment of the seal assembly of the present invention wherein the leakage gap between the two components is at its smallest predetermined position.
Figure 2:
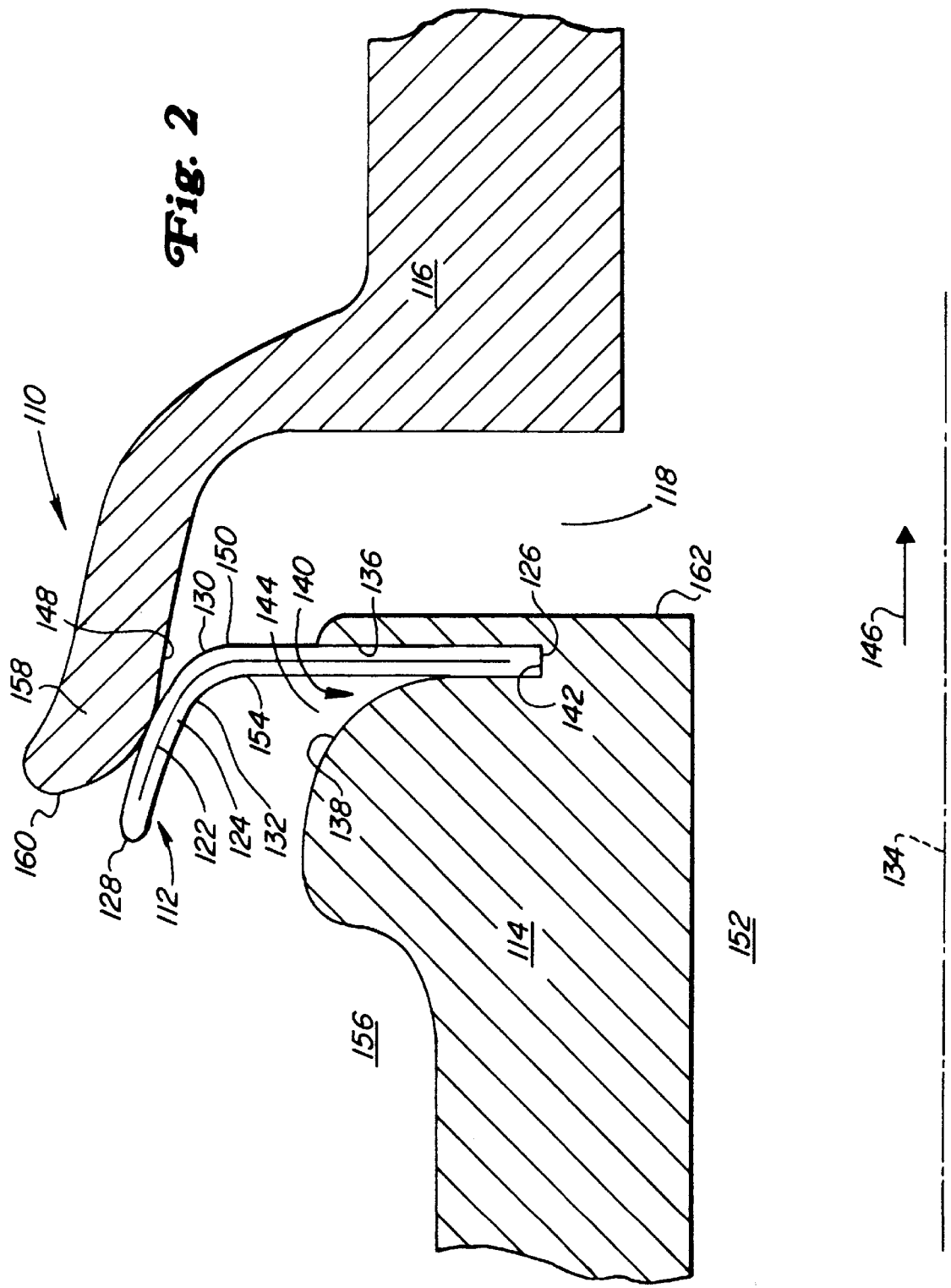
FIG. 2 is a view, as in FIG. 1, but with the leakage gap between the two components at its largest predetermined position.
Figure 3:
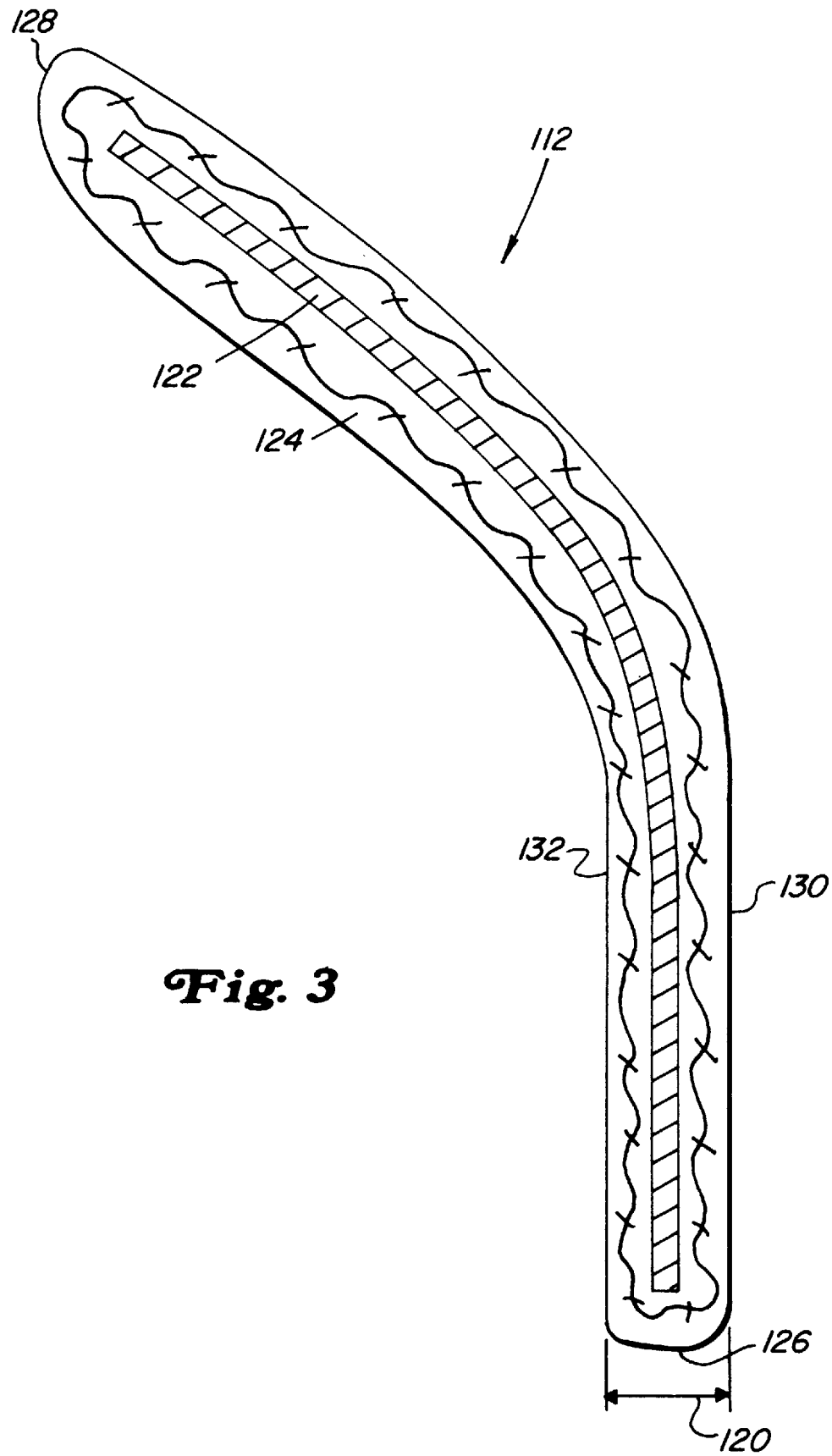
FIG. 3 is a detailed view of the cloth seal of the seal assembly of FIG. 1.

Referring now to the drawings, wherein like numerals represent like elements throughout, FIGS. 1 through 3 schematically show a first preferred embodiment of the seal assembly 110 of the present invention. The seal assembly 110 includes a flexible cloth seal 112, a first tubular end portion 114, and a second tubular end portion 116. The seal assembly 110 is for generally sealing a gas (e.g., compressed air or combustion gasses) or steam path leakage-gap 118 between the first and second tubular end portions 114 and 116 (only a small portion of which are shown in the figures). Preferably, the first and second tubular end portions 114 and 116 each have the shape of a hollow right circular cylinder, wherein the first tubular end portion 114 is an end portion of a first turbine component (which desirably is a first gas turbine component and preferably is a combustor), and wherein the second tubular end portion 116 is an end portion of a second turbine component (which desirably is a second gas turbine component and preferably is a first stage nozzle). The tubular end portions can have any tubular shape as chosen by the artisan including, without limitation, conical ducts or square conduits.

The flexible cloth seal 112 of the seal assembly 110 includes a thickness 120, a generally impervious shim assemblage 122, and a cloth assemblage 124 generally surrounding the shim assemblage 122. The flexible cloth seal 112 also includes generally opposing first and second edges 126 and 128 and generally opposing first and second sides 130 and 132 bounded by the first and second edges 126 and 128 and separated by the thickness 120. An exemplary cloth seal is disclosed in U.S. Pat. No. 5,586,773. Preferably, the thickness 120 is generally constant over the entire flexible cloth seal 112.

The shim assemblage 122 of the flexible cloth seal 112 is flexible, resilient, generally imperforate, and generally impervious to gas. The resilient quality of the shim assemblage 122 maintains the sealing properties of the flexible cloth seal 112 while allowing for different surface shapes, assembly misalignment, vibration, and/or thermally-induced relative movement between the first and second tubular end portions 114 and 116. The shim assemblage 122 comprises at least one layer of shim (as shown in FIG. 3). The shim assemblage 122 may comprise at least two superimposed and preferably identical layers of shim having staggered slots for added flexibility. The shim layer comprises (and preferably consists essentially of) a metal, ceramic, and/or polymer sheet. The choice of materials for the shim and the choice of the thickness for a shim layer are made by the artisan to meet the sealing, flexibility, and resilience requirements of a particular seal application. Preferably, the shim assemblage 122 has no more than four layers of shim. Preferably, the shim assemblage 122 has a thickness of generally between one and twenty hundredths of an inch, and each shim layer comprises (and preferably consists essentially of) a high-temperature, cobalt-based super-alloy, such as Inco-750 or HS-188. It is noted that the shim layers can comprise different materials and/or have different thicknesses depending on the particular seal application.

The cloth assemblage 124 of the flexible cloth seal 112 is flexible and comprises at least one layer of cloth (as shown in FIG. 3). The cloth assemblage 124 may comprise at least two overlying layers of cloth. A cloth layer comprises (and preferably consists essentially of) metal, ceramic, and/or polymer fibers which have been woven, knitted, or pressed into a layer of fabric. The choice of layer construction (i.e., woven, knitted, or pressed), the choice of materials for the cloth, and the choice of the thickness for a layer are made by the artisan to meet the wear resistance, flexibility, and sealing requirements of a particular seal application. Preferably, the cloth assemblage 124 has no more than two layers of cloth. It is noted that such multiple cloth layers can comprise different materials, different layer construction (i.e., woven, knitted, or pressed) and/or have different thicknesses depending on the particular seal application. Preferably, each cloth layer is a woven cloth layer. An exemplary cloth assemblage 124 is a Dutch Twill weave cloth assemblage comprising (and preferably consisting essentially of) a high-temperature, cobaltbased super-alloy, such as L-605 or Haynes-25. It is noted that the leakage in the "plane" of the cloth layer, when the cloth assemblage 124 is against the shim assemblage 122, is reduced in the weft, diagonal, and warp directions. It is noted that many gas-turbine seal applications (such as between combustor casing segments) will require curved foil-layer assemblages. Although not shown in the figures, it is pointed out that the shim assemblage may protrude through the cloth assemblage at the first and/or second edge.

The first tubular end portion 114 of the seal assembly 110 has a generally longitudinally extending axis 134. It is noted in FIGS. 1 and 2, that only the portions of the flexible cloth seal 112, and the first and second tubular end portions 114 and 116 that are above the axis 134 are shown and that those portions that are below the axis 134 have been omitted for clarity. The first tubular end portion 114 also has generally opposing, generally smooth, and spaced-apart first and second surface portions 136 and 138 defining a notch 140 therebetween. The notch 140 has a narrower bottom 142, has a wider top 144 which is also wider than the thickness 120 of the flexible cloth seal 112 proximate the top 144 of the notch 140, and extends from the bottom 142 outward from the axis 134. The second surface portion 138 is generally outside curved. The first edge 126 of the flexible cloth seal 112 is disposed in the notch 140 proximate the notch's bottom 142, and the first side 130 of the flexible cloth seal 112 proximate the first edge 126 faces the first surface portion 136 in a direction whose projection onto the axis 134 defines a first longitudinal direction 146. It is noted that the meaning of the term "proximate" includes, but is not limited to, the word "at" for the purposes of describing the present invention.

The second tubular end portion 116 of the seal assembly 110 is disposed proximate, spaced apart from, and generally coaxially aligned with, the first tubular end portion 114. The second tubular end portion 116 has a generally smooth third surface portion 148 surrounding at least a portion of the first tubular end portion 114 and extending further away from the axis 134 as one moves longitudinally in a direction opposite the first longitudinal direction 146. The first side 130 of the flexible cloth seal 112 proximate the second edge 128 contacts the third surface portion 148. The first side 130 of the flexible cloth seal 112 has a first area 150 which is exposed to a lower pressure region 152, and the second side 132 of the flexible cloth seal 112 has a second area 154 which is generally opposite the first area 150 and which is exposed to a higher pressure region 156. Preferably, the lower pressure region 152 extends inside the first and second tubular end portions 114 and 116, and the higher pressure region 156 extends outside the first and second tubular end portions 114 and 116. The second edge 128 of the flexible cloth seal 112 points in a direction whose projection onto the axis is aligned with the first longitudinal direction 146. It is noted that the radial distances of the first and second tubular end portions 114 and 116 from the axis 134 do not have to be equal for any operating condition. In operation, the leakage gap 118 will change size mainly due to relative vibration of the first and second tubular end portions 114 and 116 and/or thermal differential expansion of the first and second tubular end portions 114 and 116. As previously mentioned, the second side 132 of the flexible cloth seal 112 will lie against the outside curved second surface portion 138 of the first tubular end portion 114 during very small gaps (see FIG. 1), such second surface portion 138 providing support against elastic deformation of the flexible cloth seal 112 (and in particular the shim assemblage 122 of the flexible cloth seal 112) that would otherwise occur in "large gap change" applications, as can be appreciated by those skilled in the art.

Figure 4:
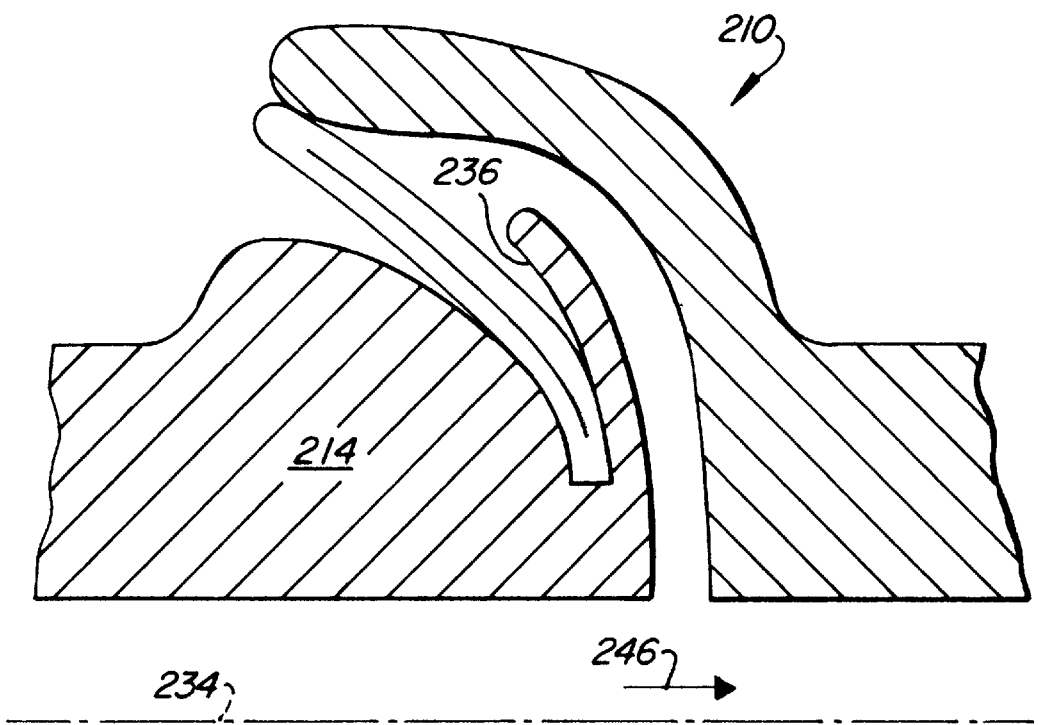
FIG. 4 is a view, as in FIG. 1, but of a second preferred embodiment of the seal assembly of the present invention.

FIG. 4 schematically shows a second preferred embodiment of the seal assembly 210 of the present invention. Seal assembly 210 is identical to seal assembly 110 of the previously-described first preferred embodiment with differences as hereinafter noted. In seal assembly 210, the first surface portion 236 of the first tubular end portion 214 curves more towards a direction opposite the first longitudinal direction 246 as one moves radially outward from the axis 234. This compares with seal assembly 110 wherein the first surface portion 136 of the first tubular end portion 114 extends generally radially outward from the axis 134.

Figure 5:
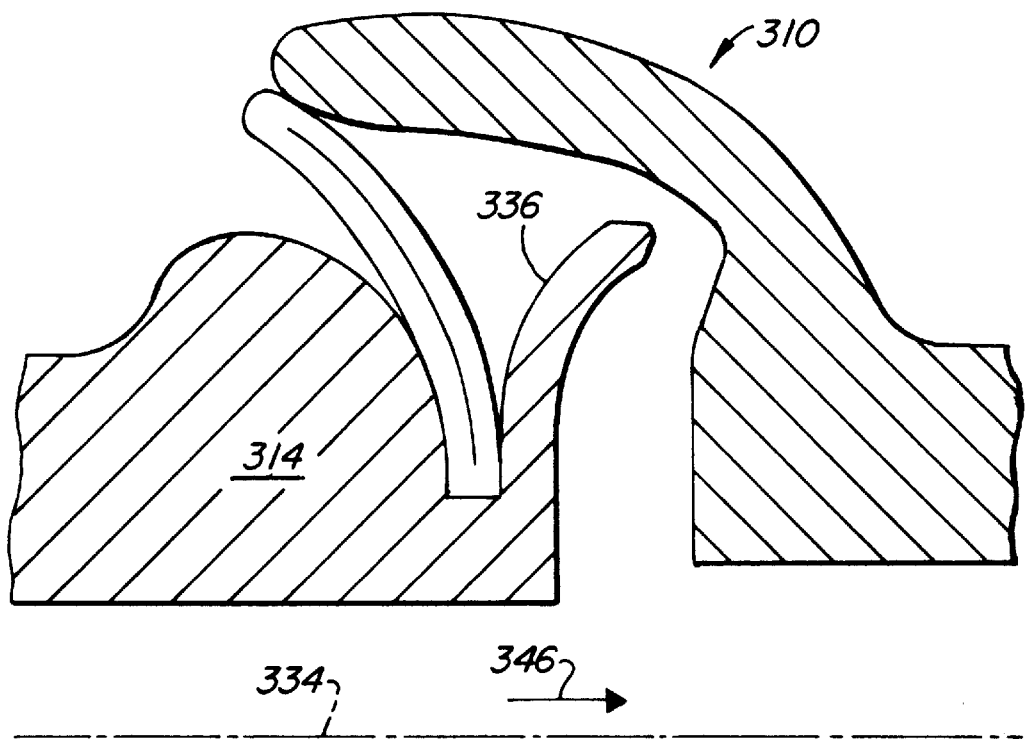
FIG. 5 is a view, as in FIG. 1, but of a third preferred embodiment of the seal assembly of the present invention.

FIG. 5 schematically shows a third preferred embodiment of the seal assembly 310 of the present invention. Seal assembly 310 is identical to seal assembly 110 of the previously-described first preferred embodiment with differences as hereinafter noted. In seal assembly 310, the first surface portion 336 of the first tubular end portion 314 curves more towards the first longitudinal direction 346 as one moves radially outward from the axis 334. This compares with seal assembly 110 wherein the first surface portion 136 of the first tubular end portion 114 extends generally radially outward from the axis 134.

FIG. 6 schematically shows a fourth preferred embodiment of the seal assembly 410 of the present invention. Seal assembly 410 is identical to seal assembly 110 of the previously-described first preferred embodiment with differences as hereinafter noted. In seal assembly 410, the third surface portion 448 of the second tubular end portion 416 is part of a flange 458 having a free end 460 which points in a direction whose projection onto the axis 434 is aligned with the first longitudinal direction 446. This compares with seal assembly 110 wherein the third surface portion 148 of the second tubular end portion 116 is part of a flange 158 having a free end 160 which points in a direction whose projection onto the axis 134 is aligned in a direction opposite the first longitudinal direction 146.

FIG. 7 schematically shows a fifth preferred embodiment of the seal assembly 510 of the present invention including the first surface portion 536 and the second surface portion 538 of the first tubular end portion 514 and the third surface portion 548 of the second tubular end portion 516. Seal assembly 510 is identical to seal assembly 110 of the previously-described first preferred embodiment with differences as hereinafter noted. In seal assembly 510, the lower pressure region 552 extends outside the first and second tubular end portions 514 and 516, and the higher pressure region 556 extends inside the first and second tubular end portions 514 and 516. This compares with seal assembly 110 wherein the lower pressure region 152 extends inside the first and second tubular end portions 114 and 116, and the higher pressure region 156 extends outside the first and second tubular end portions 114 and 116. This is true because in seal assembly 510, the first longitudinal direction 546 is opposite the first longitudinal direction 146 of the first seal assembly 110. This follows from the fact that in seal assembly 510, the first surface portion 536 is further than the second surface portion 538 from the free end 562 of the first tubular end portion 514, while in seal assembly 110, the first surface portion 136 is closer than the second surface portion 138 to the free end 162 of the first tubular end portion 114.

The foregoing description of several preferred embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A seal assembly comprising:

a) a flexible cloth seal including a thickness, a generally impervious shim assemblage, a cloth assemblage generally surrounding said shim assemblage, generally opposing first and second edges, and generally opposing first and second sides bounded by said first and second edges and separated by said thickness;

b) a first tubular end portion having a generally longitudinally extending axis and generally opposing, generally smooth, and spaced-apart first and second surface portions defining a notch therebetween, wherein said notch has a narrower bottom, has a wider top which is also wider than said thickness of said flexible cloth seal proximate said top, and extends from said bottom outward from said axis, wherein said second surface portion is generally outside curved, wherein said first edge is disposed in said notch proximate said bottom, and wherein said first side proximate said first edge faces said first surface portion in a first direction whose projection onto the axis defines a first longitudinal direction; and c) a second tubular end portion disposed proximate, spaced apart from, and generally coaxially aligned with, said first tubular end portion, wherein said second tubular end portion has a generally smooth third surface portion surrounding at least a portion of said first tubular end portion and extending further away from said axis as one moves longitudinally in a second longitudinally direction opposite said first longitudinal direction, wherein said first side proximate said second edge contacts said third surface portion, wherein said first side has a first area which is exposed to a lower pressure region and said second side has a second area which is generally opposite said first area and which is exposed to a higher pressure region, and wherein said second edge points in a second direction whose projection onto the axis defines said second longitudinal direction which is aligned opposite said first longitudinal direction.

2. The seal assembly of claim 1, wherein said lower pressure region extends inside said first and second tubular end portions and wherein said higher pressure region extends outside said first and second tubular end portions.

3. The seal assembly of claim 2, wherein said first and second tubular end portions each have the shape of a hollow right circular cylinder.

4. The seal assembly of claim 3, wherein said first tubular end portion is an end portion of a first turbine component and wherein said second tubular end portion is an end portion of a second turbine component.

5. The seal assembly of claim 4, wherein said first turbine component is a first gas turbine component and wherein said second turbine component is a second gas turbine component.

6. The seal assembly of claim 5, wherein said first gas turbine component is a combustor and wherein said second gas turbine component is a first stage nozzle.

7. The seal assembly of claim 1, wherein said second edge of said flexible cloth seal is spaced apart from said third surface portion of said second tubular end portion.

8. The seal assembly of claim 1, wherein less than fifty percent of said first side of said flexible cloth seal contacts said third surface portion of said second tubular end portion.

9. The seal assembly of claim 1, wherein said flexible cloth seal is curved as one moves along said flexible cloth seal in said first longitudinal.

10. The seal assembly of claim 1, wherein said first and second surface portions proximate said bottom of said notch are generally parallel to each other and are generally perpendicular to said axis.

11. The seal assembly of claim 1, wherein said bottom of said notch has a width along said first longitudinal which is generally equal to said thickness of said flexible cloth seal proximate said first edge of said flexible cloth seal.

12. The seal assembly of claim 1, wherein said flexible cloth seal has a length along said first side between said first and second edges which is at least five times greater than said thickness of said flexible cloth seal.

13. The seal assembly of claim 1, wherein said third surface portion of said second tubular end portion is devoid of any surface recess that could contain said second edge of said flexible cloth seal.

14. The seal assembly of claim 1, wherein said third surface portion of said second tubular end portion extends further away from said axis as long as one moves along said third surface portion along said second longitudinal direction.

* * * * *